(12) United States Patent
Yusa

(10) Patent No.: US 8,400,583 B2
(45) Date of Patent: Mar. 19, 2013

(54) LIGHT SOURCE APPARATUS AND DISPLAY APPARATUS USING LIGHT SOURCE APPARATUS

(75) Inventor: Katsuhiko Yusa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 269 days.

(21) Appl. No.: 12/979,632

(22) Filed: Dec. 28, 2010

(65) Prior Publication Data
US 2011/0157519 A1    Jun. 30, 2011

(30) Foreign Application Priority Data

Dec. 28, 2009  (JP) ................................ 2009-298632

(51) Int. Cl.
*G02F 1/1333*  (2006.01)
*G02F 1/1335*  (2006.01)
*F21V 11/00*   (2006.01)

(52) U.S. Cl. ............ 349/64; 349/58; 349/62; 362/97.2; 362/355; 362/600; 362/633

(58) Field of Classification Search .................. None
See application file for complete search history.

(56) References Cited

U.S. PATENT DOCUMENTS

| | | | |
|---|---|---|---|
| 6,512,557 B1 * | 1/2003 | Miwa ............................... | 349/58 |
| 6,626,550 B2 * | 9/2003 | Choi ............................... | 362/632 |
| 7,490,973 B2 * | 2/2009 | Fujikawa et al. ............... | 362/634 |
| 7,656,470 B2 * | 2/2010 | Yu .................................. | 349/58 |
| 7,798,700 B2 * | 9/2010 | Sun ............................... | 362/628 |
| 2002/0044234 A1 * | 4/2002 | Choi ............................... | 349/65 |
| 2003/0043312 A1 * | 3/2003 | Nishida et al. ................. | 349/58 |
| 2003/0218702 A1 * | 11/2003 | Kwon et al. ................... | 349/65 |
| 2005/0259444 A1 * | 11/2005 | Choi ............................... | 362/633 |
| 2006/0114689 A1 * | 6/2006 | Chang et al. .................. | 362/561 |
| 2008/0094535 A1 * | 4/2008 | Suh et al. ...................... | 349/58 |
| 2009/0153766 A1 * | 6/2009 | Lee et al. ....................... | 349/58 |
| 2009/0237590 A1 * | 9/2009 | Kwon et al. ................... | 349/58 |

FOREIGN PATENT DOCUMENTS

JP    2005-166336    6/2005

* cited by examiner

*Primary Examiner* — Michelle R Connelly
(74) *Attorney, Agent, or Firm* — Holtz, Holtz, Goodman & Chick, P.C.

(57) ABSTRACT

A light source apparatus include a light guide plate, a plurality of optical sheets and a frame, wherein one of the optical sheets is a prism sheet having a plurality of prisms on one surface and one or more integrally formed dark part suppressing projecting pieces engaging the frame. A pair of dark part suppressing sides adjoin the dark part suppressing projecting piece and form a first angle equal to or smaller than a dark part suppressing angle. Second angles making a pair of angles formed with a straight line and each of dark part suppressing sides are equal to or smaller than half of the dark part suppressing angle. The straight line passes through a region formed between the pair of dark part suppressing sides, passes through an intersection point of the pair of dark part suppressing sides and is parallel or perpendicular to ridge lines of the prisms.

15 Claims, 12 Drawing Sheets

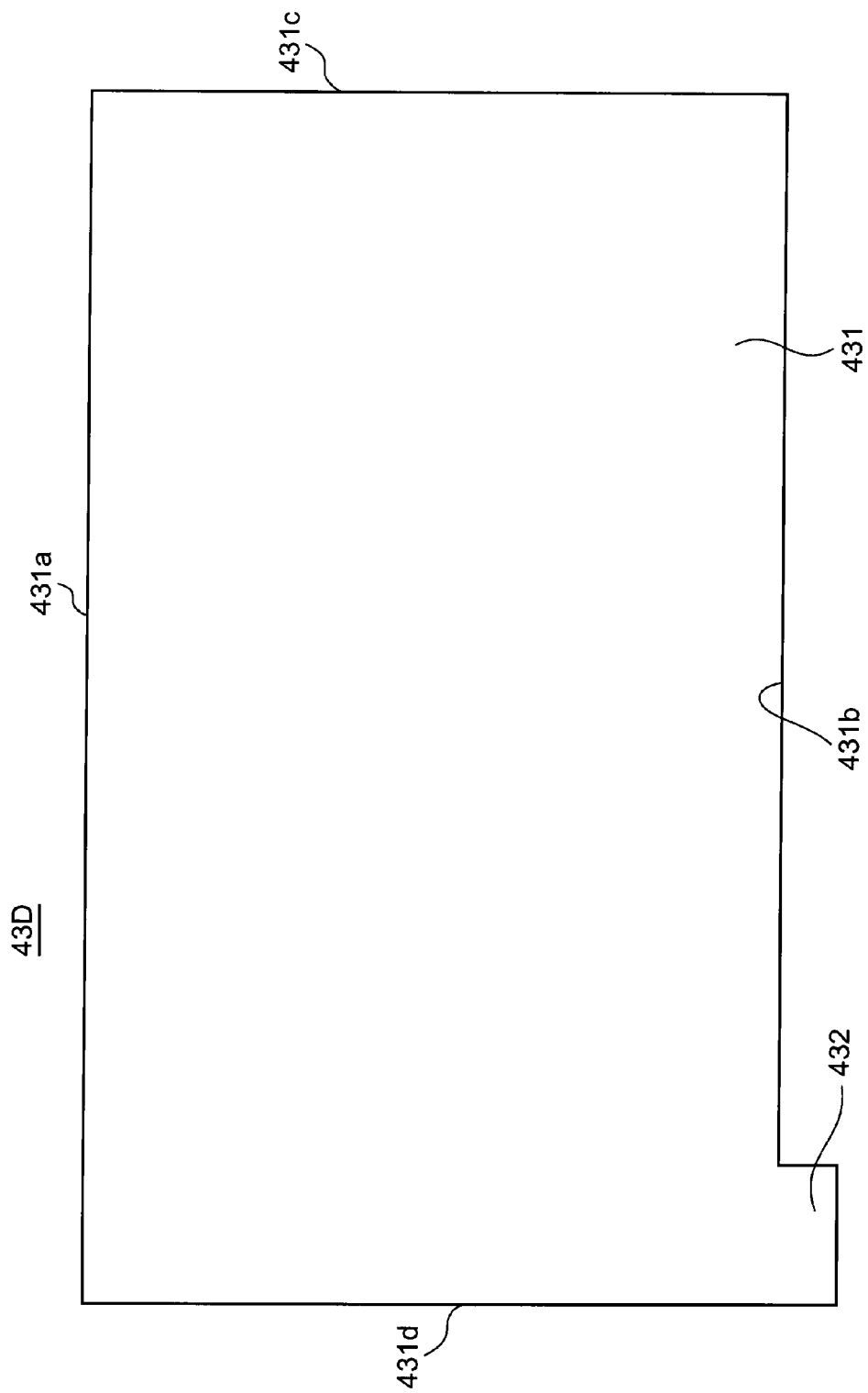

LIGHT SOURCE APPARATUS AND DISPLAY APPARATUS USING LIGHT SOURCE APPARATUS

CROSS-REFERENCE TO RELATED APPLICATIONS

This application is based upon and claims the benefit of priority under 35 USC 119 of Japanese Patent Application No. 2009-298632 filed on Dec. 28, 2009, the entire disclosure of which, including the description, claims, drawings, and abstract, is incorporated herein by reference in its entirety.

BACKGROUND OF THE INVENTION

1. Field of the Invention

The present invention relates to a light source apparatus and a display apparatus using the light source apparatus.

2. Description of the Related Art

Conventionally, for example, in a liquid crystal display apparatus disclosed in Japanese Patent Application Laid-Open Publication No. 2005-166336, the light source apparatus is arranged at the back surface side of the display panel. The light source apparatus is provided with a light source, alight guide plate for radiating light from the light source into a plane, a plurality of optical sheets for adjusting the radiation direction of the light that passed through the light guide plate and a frame for housing the above-mentioned components.

A projecting piece for positioning the optical sheet extends from each of the optical sheets, and the positioning of the optical sheet itself is carried out by arranging the projecting piece so as to fit an engaging concave portion provided on the frame.

Here, because the projecting piece of each of the optical sheets is arranged so as to fit the engaging concave portion provided on the frame, the light radiated from the light guide plate to the projecting piece is blocked by the frame and there may be parts which appear dark on the optical sheet depending on the angle from which the light source apparatus is seen.

BRIEF SUMMARY OF THE INVENTION

A light source apparatus of the present invention includes a light guide plate, a plurality of optical sheets provided so as to be layered on a light emitting surface of the light guide plate and a frame housing the light guide plate and the plurality of optical sheets therein, wherein one of the plurality of optical sheets which is arranged at a position most distant from the light guide plate is a prism sheet, the prism sheet having (i) a plurality of prisms formed on one surface thereof which are extended in parallel with each other, and (ii) one or more projecting pieces which are integrally formed with the prism sheet in a shape projecting from a fringe of the prism sheet, the one or more projecting pieces engage to the frame, at least one of the one or more projecting pieces is a dark part suppressing projecting piece, sides making a pair of sides adjoining the dark part suppressing projecting piece are dark part suppressing sides, a first angle formed by the pair of dark part suppressing sides is equal to or smaller than a dark part suppressing angle, and second angles making a pair of angles formed with a straight line and each of the sides making the pair of dark part suppressing sides are equal to or smaller than half of the dark part suppressing angle, the straight line (i) passing through a region formed between the pair of dark part suppressing sides, (ii) passing through an intersection point of the pair of dark part suppressing sides and (iii) being parallel or perpendicular to ridge lines of the prisms.

Further, a display apparatus of the present invention includes, a light source apparatus including a light guide plate, a plurality of optical sheets provided so as to be layered on a light emitting surface of the light guide plate and a frame housing the light guide plate and the plurality of optical sheets therein, wherein one of the plurality of optical sheets which is arranged at a position most distant from the light guide plate is a prism sheet, the prism sheet having (i) a plurality of prisms formed on one surface thereof which are extended in parallel with each other, and (ii) one or more projecting pieces which are integrally formed with the prism sheet in a shape projecting from a fringe of the prism sheet, the one or more projecting pieces engage to the frame, at least one of the one or more projecting pieces is a dark part suppressing projecting piece, sides making a pair of sides adjoining the dark part suppressing projecting piece are dark part suppressing sides, a first angle formed by the pair of dark part suppressing sides is equal to or smaller than a dark part suppressing angle, and second angles making a pair of angles formed with a straight line and each of the sides making the pair of dark part suppressing sides are equal to or smaller than half of the dark part suppressing angle, the straight line (i) passing through a region formed between the pair of dark part suppressing sides, (ii) passing through an intersection point of the pair of dark part suppressing sides and (iii) being parallel or perpendicular to ridge lines of the prisms, and a back light type display panel arranged on the plurality of optical sheets of the light source apparatus, wherein the dark part suppressing projecting piece is arranged at a position where the dark part suppressing projecting piece does not enter a display region of the display panel when suppose that the dark part suppressing projecting piece is moved in parallel along each of the sides making the pair of dark part suppressing sides.

Furthermore, a light source apparatus includes a light guide plate, a plurality of optical sheets provided so as to be layered on a light emitting surface of the light guide plate and a frame housing the light guide plate and the plurality of optical sheets therein, wherein a back light type display panel is arranged on the plurality of optical sheets of the light source apparatus, one of the plurality of optical sheets which is arranged at a position most distant from the light guide plate is a prism sheet, the prism sheet having (i) a plurality of prisms formed on one surface thereof which are extended in parallel with each other and (ii) one or more projecting pieces which are integrally formed with the prism sheet in a shape projecting from a fringe of the prism sheet, the one or more projecting pieces engage to the frame, at least one of the one or more projection pieces is a dark part suppressing projecting piece, sides making a pair of sides adjoining the dark part suppressing projecting piece are dark part suppressing sides, and the dark part suppressing projecting piece is arranged at a sheet corner part where the dark part suppressing projecting piece does not enter a display region of the display panel when suppose that the dark part suppressing projecting piece is moved in parallel along each of the sides making the pair of dark part suppressing sides between which the sheet corner part is formed.

Moreover, a display apparatus of the present invention includes a light source apparatus includes a light guide plate, a plurality of optical sheets provided so as to be layered on a light emitting surface of the light guide plate and a frame housing the light guide plate and the plurality of optical sheets therein, wherein a back light type display panel is arranged on the plurality of optical sheets of the light source apparatus, one of the plurality of optical sheets which is arranged at a position most distant from the light guide plate is a prism sheet, the prism sheet having (i) a plurality of prisms formed on one surface thereof which are extended in parallel with each other and (ii) one or more projecting pieces which are integrally formed with the prism sheet in a shape projecting from a fringe of the prism sheet, the one or more projecting pieces engage to the frame, at least one of the one or more projection pieces is a dark part suppressing projecting piece, sides making a pair of sides adjoining the dark part suppressing projecting piece are dark part suppressing sides, and the dark part suppressing projecting piece is arranged at a sheet corner part where the dark part suppressing projecting piece does not enter a display region of the display panel when suppose that the dark part suppressing projecting piece is moved in parallel along each of the sides making the pair of dark part suppressing sides between which the sheet corner part is formed and a back light type display panel arranged on the plurality of optical sheets of the light source apparatus, wherein the dark part suppressing projecting piece is arranged at a position where the dark part suppressing projecting piece does not enter a display region of the display panel when suppose that the dark part suppressing projecting piece is moved in parallel along each of the sides making the pair of dark part suppressing sides.

Further, a light source apparatus includes a light guide plate, a plurality of optical sheets provided so as to be layered on a light emitting surface of the light guide plate and a frame housing the light guide plate and the plurality of optical sheets therein, wherein one of the plurality of optical sheets which is arranged at a position most distant from the light guide plate is a prism sheet, the prism sheet having (i) a plurality of prisms formed on one surface thereof which are extended in parallel with each other (ii) an approximately rectangular shape and (iii) dark part suppressing pieces each of which is integrally formed at each of sheet corner parts of the prism sheet in a shape projecting from a fringe of the prism sheet, the dark part suppressing pieces engage to the frame, sides making a pair of sides adjoining each of the dark part suppressing projecting pieces are dark part suppressing sides, all of first angles formed by a plurality of pairs of dark part suppressing sides respectively adjoining the dark part suppressing projecting pieces are 90 degrees, and all of second angles making a plurality of pairs of angles respectively corresponding to the dark part suppressing projecting pieces are 45 degrees, each of the pairs of angles being formed with a straight line and each of the sides making the pair of dark part suppressing sides wherein the straight line (i) passing through a region formed between the pair of dark part suppressing sides (ii) passing through an intersection point of the pair of dark part suppressing sides and (iii) being parallel or perpendicular to ridge lines of the prisms.

Furthermore, a display apparatus of the present invention includes a light source apparatus includes a light guide plate, a plurality of optical sheets provided so as to be layered on a light emitting surface of the light guide plate and a frame housing the light guide plate and the plurality of optical sheets therein, wherein one of the plurality of optical sheets which is arranged at a position most distant from the light guide plate is a prism sheet, the prism sheet having (i) a plurality of prisms formed on one surface thereof which are extended in parallel with each other (ii) an approximately rectangular shape and (iii) dark part suppressing pieces each of which is integrally formed at each of sheet corner parts of the prism sheet in a shape projecting from a fringe of the prism sheet, the dark part suppressing pieces engage to the frame, sides making a pair of sides adjoining each of the dark part suppressing projecting pieces are dark part suppressing sides, all of first angles formed by a plurality of pairs of dark part suppressing sides respectively adjoining the dark part suppressing projecting pieces are 90 degrees, and all of second angles making a plurality of pairs of angles respectively corresponding to the dark part suppressing projecting pieces are 45 degrees, each of the pairs of angles being formed with a straight line and each of the sides making the pair of dark part suppressing sides wherein the straight line (i) passing through a region formed between the pair of dark part suppressing sides (ii) passing through an intersection point of the pair of dark part suppressing sides and (iii) being parallel or perpendicular to ridge lines of the prisms and a liquid crystal display panel arranged on the plurality of optical sheets of the light source apparatus, which has a display region in an approximately rectangular shape, wherein the dark part suppressing projecting pieces are arranged at positions where the dark part suppressing projecting pieces do not enter a display region of the display panel when suppose that the dark part suppressing projecting pieces are moved in parallel along each of the sides making the pair of dark part suppressing sides.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 12 is a top view showing a modification 4 of the first prism sheet of FIG. 5.

DESCRIPTION OF THE PREFERRED EMBODIMENTS

Embodiments of the present invention will be explained with reference to the drawings.

Hereinafter, the best mode for carrying out the present invention will be described with reference to the drawings. However, although technically preferable various limitations for carrying out the present invention are given to the embodiment described below, the scope of the invention is not limited to the following embodiment and shown examples.

Figure 1:
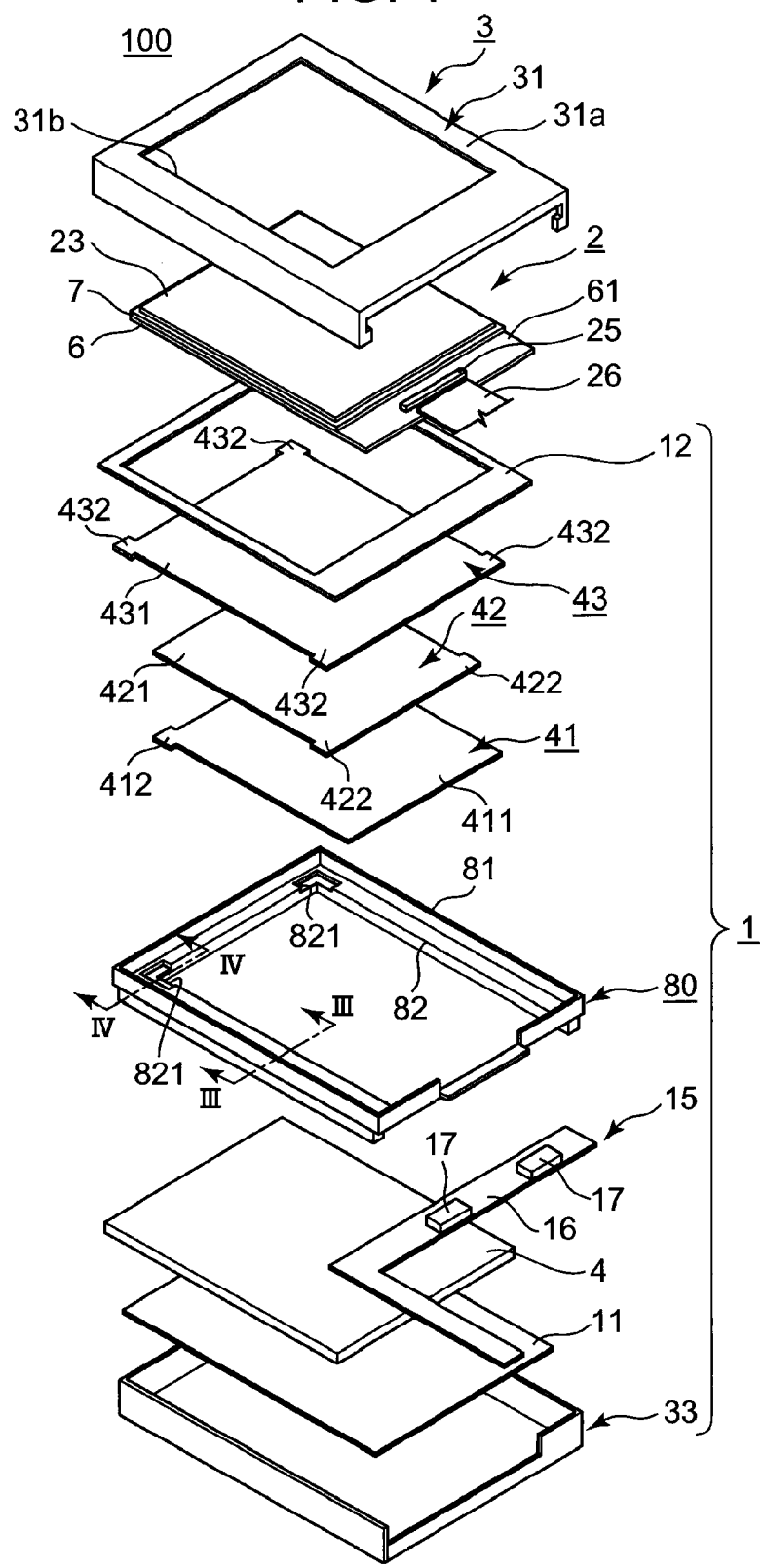
FIG. 1 is an exploded perspective view schematically showing an overall configuration of a display apparatus of the embodiment.
Figure 2:
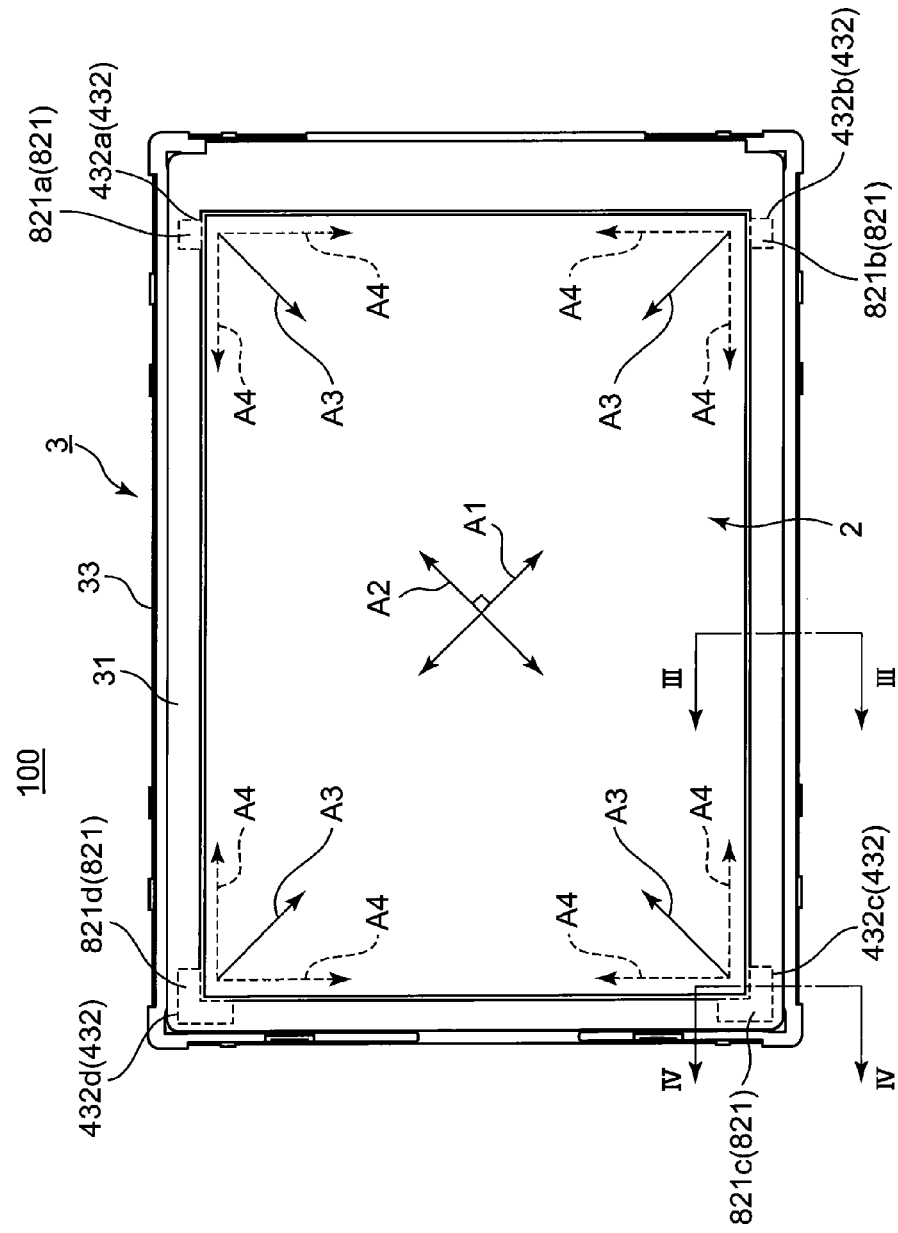
FIG. 2 is a top view showing a schematic configuration of the display apparatus of FIG. 1.
Figure 3:
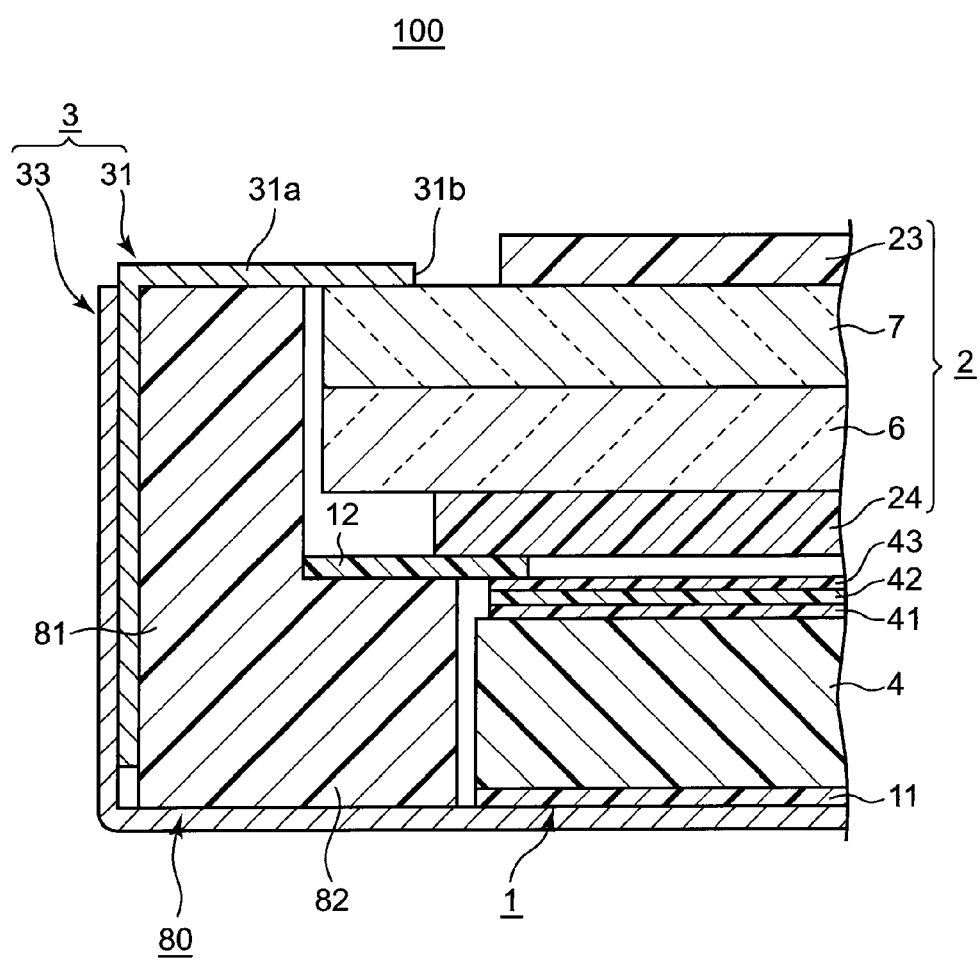
FIG. 3 is a cross-sectional view showing a cross-sectional configuration observed from a cutting line III-III in FIGS. 1 and 2.
Figure 4:
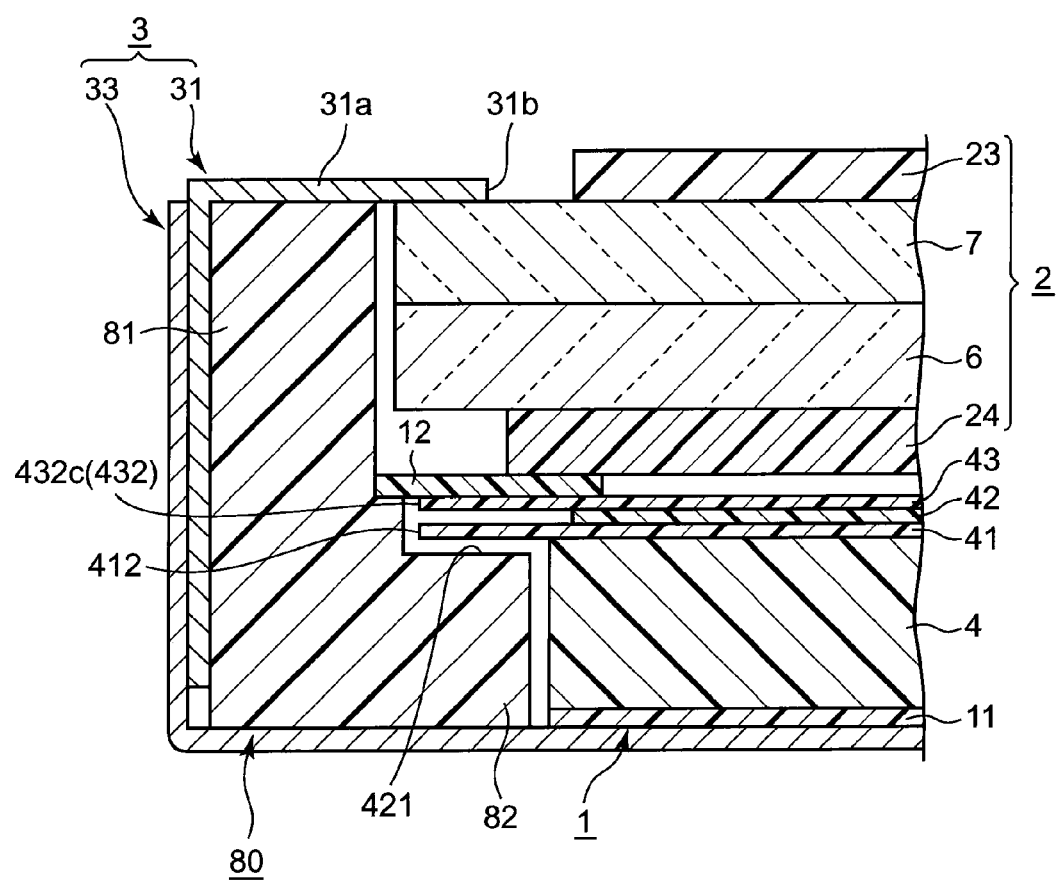
FIG. 4 is a cross-sectional view showing a cross-sectional configuration observed from a cutting line IV-IV in FIGS. 1 and 2.

FIG. 1 is an exploded perspective view schematically showing an overall configuration of a display apparatus according to the embodiment, FIG. 2 is a top view of the display apparatus, FIG. 3 is a cross-sectional view showing a cross-sectional configuration observed from the cutting line III-III in FIGS. 1 and 2 and FIG. 4 is a cross-sectional view showing a cross-sectional configuration observed from a cutting line IV-IV in FIGS. 1 and 2. As shown in FIGS. 1 to 4, a display apparatus 100 includes a light source apparatus 1, a liquid crystal display panel 2, a case 3 and the like.

The case 3 is a member supporting a liquid crystal display apparatus which is the display apparatus 100, and the case 3 includes an upper case 31 and a lower case 33. A rectangular opening 31b for display is formed in the top plate 31a of the upper case 31. The light source apparatus 1 and the liquid crystal display panel 2 are housed in the lower case 33, and the upper case 31 engages with the lower case 33 so as to cover the light source apparatus 1 and the liquid crystal display panel 2.

The liquid crystal display panel 2 is a liquid crystal display device which is driven by the active matrix system, which is a back light type display panel. The liquid crystal display panel 2 includes a pair of transparent substrates 6 and 7 which are placed facing each other having a predetermined gap therebetween as shown in FIGS. 2 to 4. Liquid crystal (not shown) is enclosed in the gap between the transparent substrates 6 and 7. A first and the second transparent electrodes (not shown) are provided on the inner surfaces of the pair of transparent substrates 6 and 7, which face each other, in a state where the first and the second transparent electrodes are facing each other. The first and the second transparent electrodes, which change the oriented states of the liquid crystal molecules in the liquid crystal layer by applying voltage to control the transmission of light, form a plurality of pixels in a matrix. Furthermore, a polarizing plate 23 is attached on an external surface of the transparent substrate 7 on the observing side which contacts the upper case 31. On the other hand, a polarizing plate 24 is attached on an external surface of the transparent substrate 6 on the back surface side. Furthermore, a projection portion 61 projecting from the transparent substrate 7 on the observing side is formed in the transparent substrate 6 on the back surface side. A driver device 25 for applying a drive voltage between the transparent electrodes is mounted on the projection portion 61. Moreover, a flexible wiring substrate 26 for supplying a control signal from an external circuit to the driver device 25 is connected to the projection portion 61.

Next, the light source apparatus 1 will be described.

The light source apparatus 1 performs surface emission toward the liquid crystal display panel 2, and is arranged behind the liquid crystal display panel 2, that is, on a side opposite to the observation side of the liquid crystal display panel 2. As shown in FIGS. 1 to 4, the light source apparatus 1 includes a reflection sheet 11, a plurality of optical sheets 41, 42 and 43, a light blocking sheet 12, a LED (light emitting diode) unit 15, a light guide plate 4 and a frame 80.

The reflection sheet 11 is placed at the back surface of the light guide plate 4, that is, on the lower case 33 side of the light guide plate 4, so as to face the light guide plate 4, and the reflection sheet 11 reflects the light emitted from the back surface of the light guide plate 4 to the light guide plate 4 side.

The plurality of optical sheets 41, 42 and 43 are layered on the emission surface of the light guide plate 4 in the order of the optical sheets 41, 42 and 43.

Figure 5:
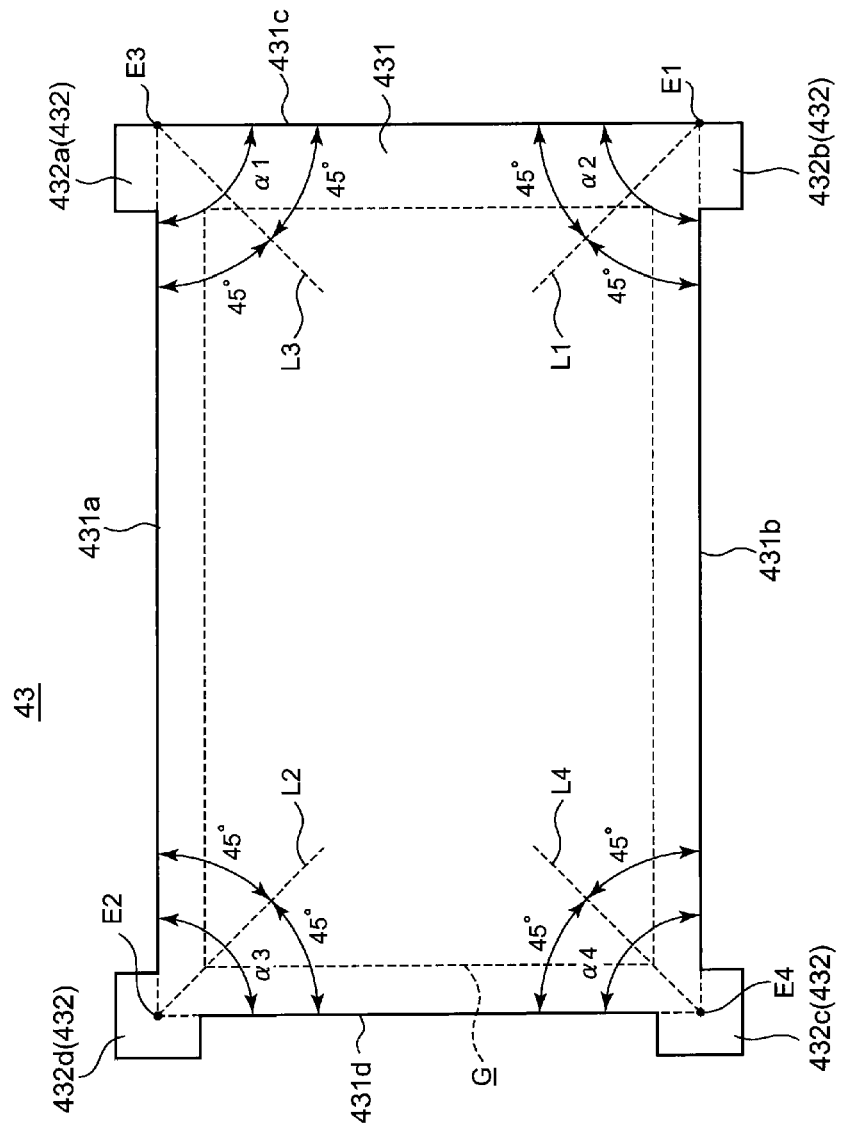
FIG. 5 is a top view showing an overall figuration of a first prism sheet provided in the display apparatus of FIG. 1.

The optical sheet 43 which is arranged at a position most distant from the light guide plate 4 among the plurality of optical sheets 41, 42 and 43 is a first prism sheet in which a plurality of prisms extending in parallel with each other are formed on one surface thereof. FIG. 5 is a top view showing an overall figuration of the optical sheet 43 which is the first prism sheet. As shown in FIG. 5, the optical sheet 43 includes a sheet main body 431 in approximately rectangular shape and four projecting pieces 432 (dark part suppressing projecting pieces) which are integrally formed at fringes of four corners of the sheet main body 431, respectively, in a shape so as to project outward from the fringes. Furthermore, angles formed by a plurality of pairs of sides (dark part suppressing sides), each of the pairs of sides adjoining each of the projection pieces 432, respectively, are set so as to have an angle which is equal to or smaller than a dark part suppressing angle. The dark part suppressing angle is an angle that approximately coincides with a dark part constituting angle formed by a pair of straight lines each of which is parallel to each of two directions from which parts of the optical sheet 43 are observed to be especially darker comparing to when observed from the ridge line direction of the prisms or from the direction perpendicular to the ridge line direction. In the embodiment, the dark part suppressing angle is set to 100 degrees.

Among the four projecting pieces 432, a pair of projecting pieces 432a and 432b on the driver device 25 side is formed so that the projecting pieces making the pair have an approximately rectangular shape projecting outward with respect to the long sides 431a and 431b of the sheet main body 431, respectively. Angles formed by the pairs of sides respectively adjoining the projecting pieces 432a and 432b, that is, an angle $\alpha 1$ formed by a long side 431a and a short side 431c and an angle $\alpha 2$ formed by a long side 431b and the short side 431c are set to be 90 degrees, which is an angle that is equal to or smaller than the dark part suppressing angle.

Further, the projecting piece 432a is arranged at a position where the projecting piece 432a does not enter a display region G of the liquid crystal display panel 2 when suppose that the projecting piece 432a is moved in parallel with respect to each of the sides 431a and 431c making the adjoining pair of sides. Furthermore, the projecting piece 432b is also arranged at a position where the projecting piece 432b does not enter the display region G when suppose that the projecting piece 432b is moved in parallel with respect to each of the sides 431b and 431c making the adjoining pair of sides.

Moreover, among the four projecting pieces 432, a pair of projecting pieces 432c and 432d on the opposite side of the driver device 25 is formed so that the projecting pieces making the pair have an approximately L-shape projecting outward with respect to a sheet corner part of the sheet main body 431 defined by the long side 431a and a short side 431d and a sheet corner part of the sheet main body 431 defined by the long side 431b and the short side 431d. Hereby, the projecting pieces 432c and 432d have at least two projecting piece angle portions which do not overlap with the extension lines of the sides 431a, 431b and 431d by which the pairs of sides are made.

Angles formed by pairs of sides adjoining the projecting pieces 432c and 432d, that is, an angle $\alpha 3$ formed by the long side 431a and the short side 431d and an angle $\alpha 4$ formed by the long side 431b and the short side 431d are set to 90 degrees which is an angle that is equal to or smaller than the dark part suppressing angle.

Further, the projecting piece 432c is arranged at a position where the projecting piece 432c does not enter the display region G of the liquid crystal display panel 2 when suppose that the projecting piece 432c is moved in parallel with respect to each of the sides 431b and 431d making the adjoining pair of sides. Furthermore, the projecting piece 432d is also arranged at a position where the projecting piece 432d does not enter the display region G when suppose that the projecting piece 432d is moved in parallel with respect to each of the sides 431a and 431d making the adjoining pair of sides.

Each of two angles formed by a straight line L1 and each of the sides 431b and 431c making the pair of sides is set to 45 degrees, wherein the straight line L1 passing through an intersection point E1 and the region formed between the pair of sides 431b and 431c and being parallel to ridge lines of the prisms and the intersection point E1 being formed by extending the pair of sides 431b and 431c adjoining the projecting piece 432b.

Further, each of two angles formed by a straight line L2 and each of the sides 431a and 431d making the pair of sides is set to 45 degrees, wherein the straight line L2 passing through the intersection point E2 and the region formed between the pair of sides 431a and 431d and being parallel to ridge lines of the prisms and the intersection point E2 being formed by extending the pair of sides 431a and 431d adjoining the projecting piece 432d.

On the other hand, each of two angles formed by a straight line L3 and each of the sides 431a and 431c making the pair of sides is set to 45 degrees, wherein the straight line L3 passing through an intersection point E3 and the region formed between the pair of sides 431a and 431c and being perpendicular to ridge lines of the prisms and the intersection point E3 being formed by extending the pair of sides 431a and 431c adjoining the projecting piece 432a.

Further, each of two angles formed by a straight line L4 and each of the sides 431b and 431d making the pair of sides is set to 45 degrees, wherein the straight line L4 passing through an intersection point E4 and the region formed between the pair of sides 431b and 431d and being perpendicular to ridge lines of the prisms and the intersection point E4 being formed by extending the pair of sides 431b and 431d adjoining the projecting piece 432c.

Further, the optical sheet 43 is arranged so that the ridge line direction of a plurality of prisms be 45 degrees with respect to the row direction or the column direction of the pixels of the liquid crystal display panel 2.

Figure 6:
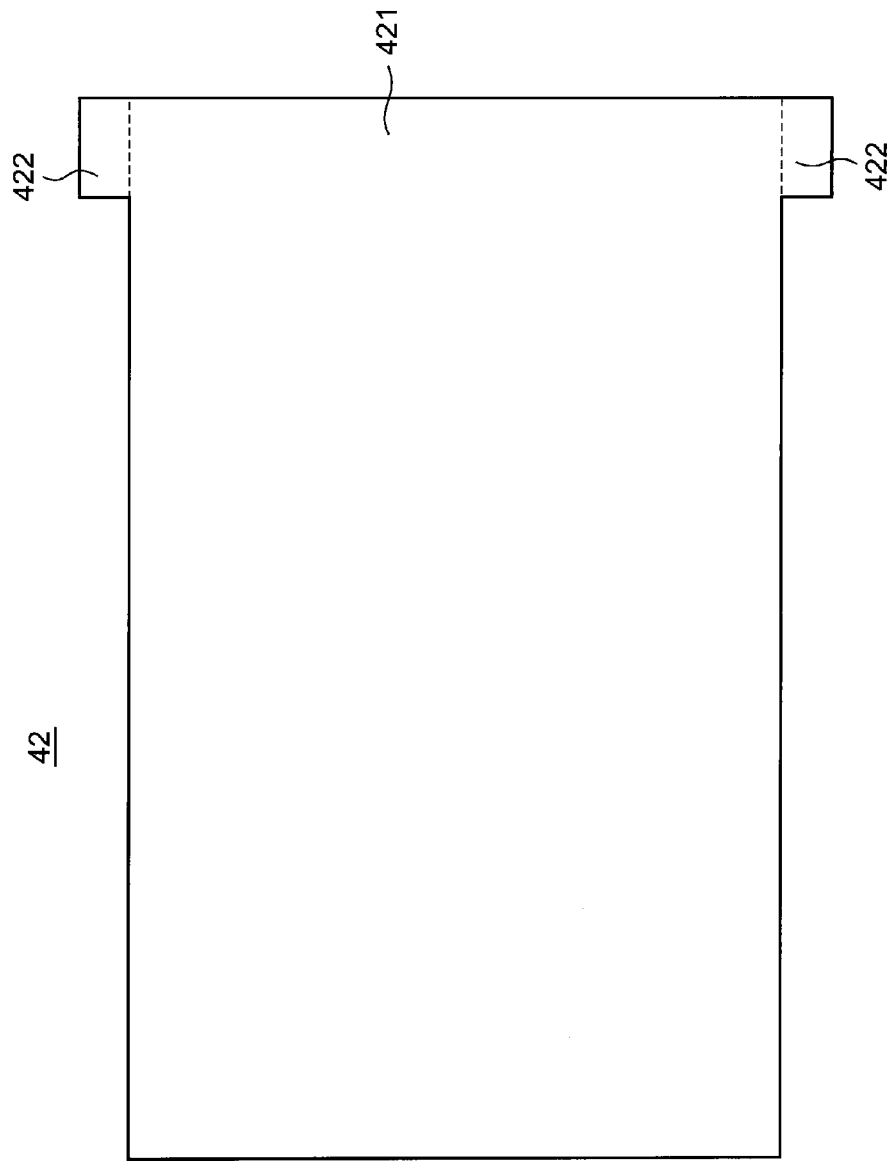
FIG. 6 is a top view showing an overall figuration of a second prism sheet provided in the display apparatus of FIG. 1.

Among the plurality of optical sheets 41, 42 and 43, the optical sheet 42 at the back surface side of the optical sheet 43 is a second prism sheet in which a plurality of prisms extending in parallel to each other are formed on one surface thereof. FIG. 6 is a top view showing an overall figuration of the optical sheet 42 which is the second prism sheet. As shown in FIG. 6, the optical sheet 42 includes a sheet main body 421 having approximately same shape as the sheet main body 431 of the optical sheet 43 and two projecting pieces 422 respectively formed at the fringes of the pair of corner parts of the sheet main body 421 on the driver device 25 side. The two projecting pieces 422 are formed in the same shape as the projecting pieces 432a and 432b of the optical sheet 43. The projecting pieces 422 of the optical sheet 42 are formed so as to respectively overlap the projecting pieces 432a and 432b of the optical sheet 43 when the optical sheet 42 is made to be layered on the optical sheet 43.

The direction of ridge lines of the prisms of the optical sheet 42 is not parallel to the ridge lines of the prisms of the optical sheet 43, and for example, the direction of ridge lines of the prisms of the optical sheet 42 is parallel to the direction perpendicular to the direction of ridge lines of the prisms of the optical sheet 43.

Among the plurality of optical sheets 41, 42 and 43, the optical sheet 41 at the back surface side of the optical sheet 42, that is, on the emission surface of the light guide plate 4, is a diffusion sheet. The diffusion sheet is for making the luminance be uniform by diffusing the light emitted from the light guide plate 4.

Figure 7:
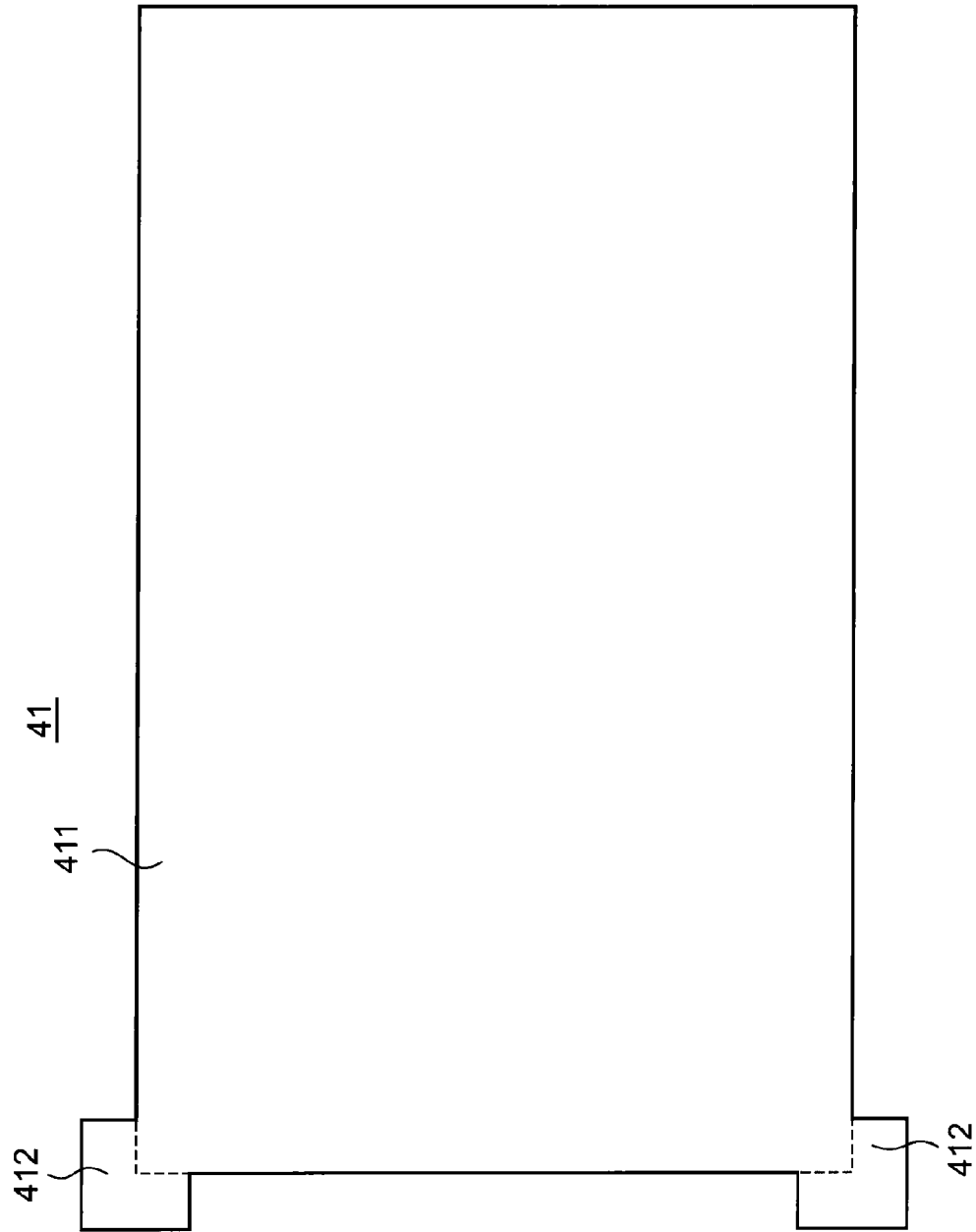
FIG. 7 is a top view showing an overall figuration of a diffusion sheet provided in the display apparatus of FIG. 1.

FIG. 7 is a top view showing an overall figuration of the optical sheet 41 which is a diffusion sheet. As shown in FIG. 7, the optical sheet 41 includes a sheet main body 411 having approximately same shape as the sheet main body 431 of the optical sheet 43 and two projecting pieces 412 which are formed at the fringes of a pair of corner parts of the sheet main body 411 on the opposite side of the driver device 25 side. The two projecting pieces 412 are formed in the same shape as the projecting pieces 432c and 432d of the optical sheet 43. The projecting pieces 412 of the optical sheet 41 are formed so as to respectively overlap the projecting pieces 432c and 432d of the optical sheet 43 when the optical sheet 41 is made to be layered on the optical sheet 43.

Further, the light which is emitted from the emission surface of the light guide plate 4 can be emitted toward in a direction which is approximately perpendicular to the emission surface of the optical sheet 43 by the optical sheets 41, 42 and 43.

As shown in FIGS. 1, 3 and 4, the light blocking sheet 12 is formed in an approximately frame shape when observed from upper side. The light blocking sheet 12 encloses the fringe portion of the optical sheet 43 to prevent leakage of light from the fringe portion of the optical sheet 43. The light blocking sheet 12 is supported by the frame 80 in a state of being sandwiched by the polarizing plate 24 of the liquid crystal display panel 2 and the optical sheet 43.

The LED unit 15 is arranged at the light guide plate 4 side, and supplies light to the light guide plate 4. The LED unit 15 includes a flexible wiring substrate 16 and a plurality of LEDs 17. Each of the plurality of LEDs 17 is light source formed in an approximately rectangular parallelepiped shape and is arranged on the flexible wiring substrate 16 so that the light emitting surface thereof faces the light guide plate 4.

The frame 80 houses the reflection sheet 11, the light guide plate 4, the plurality of optical sheets 41, 42 and 43 and the light blocking sheet 12 therein. The frame 80 is composed of a frame main body 81 and an extending portion 82. The frame main body 81 encloses the peripheries of the reflection sheet 11, the light guide plate 4, the plurality of optical sheets 41, 42 and 43, the light blocking sheet 12, and the liquid crystal display panel 2. The extending portion 82 extends from the inner peripheral surface of the frame main body 81 to proximity of the reflection sheet 11, the light guide plate 4 and the plurality of optical sheets 41, 42 and 43. The light blocking sheet 12 is supported by the top face of the extending portion 82. Furthermore, engaging concave portions 821 for engaging with the projecting pieces 412, 422 and 432 are respectively formed at positions corresponding to the projecting pieces 412, 422 and 432 of the plurality of optical sheets 41, 42 and 43 on the top face of the extending portion 82. The engaging concave portions 821 are formed in shapes corresponding to the shapes of the projecting pieces 412, 422 and 432, which are the engaging objects.

Next, an operation of the embodiment will be described.

Figure 8:
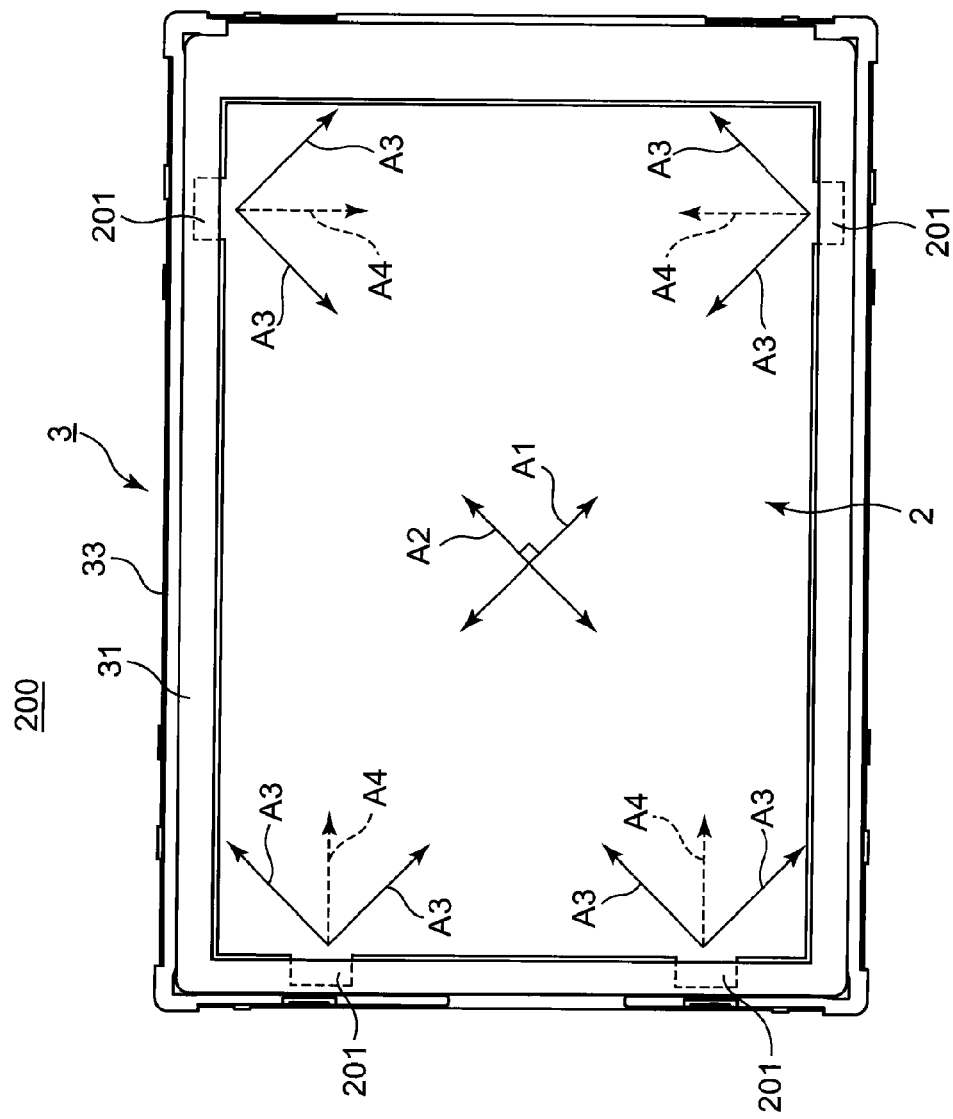
FIG. 8 is a top view showing a schematic configuration of a display apparatus of a comparative example.

First, as a comparative example, a light source apparatus in which projecting pieces are formed at the middle positions of the sides of an optical sheet is exemplified to be described. FIG. 8 is a top view showing a schematic configuration of a light source apparatus 200 which is a comparative example. In addition, the same parts of the light source apparatus 200 as those of the aforesaid embodiment are denoted by the same symbols as those of the aforesaid embodiment, and their descriptions are omitted. In the light source apparatus 200, one rectangular projecting piece 201 is formed at a middle position of each of the long sides 431a and 431b of the optical sheet 43, and two rectangular projecting pieces 201 are formed at middle positions of the short side 431d having a predetermined interval between them.

When the LEDs 17 of the light source apparatus 200 emit light and when the light enters the light guide plate 4 to be reflected by the reflection sheet 11, the reflected light passes through the plurality of optical sheets 41, 42 and 43 to irradiate the light to the liquid crystal display panel 2 from the back surface side. At this time, parts on the optical sheet 43 arranged at the position most distant from the light guide plate 4 are especially observed to be darker when the projecting pieces 201 are observed from the directions inclined by 45 degrees to the positive direction or the negative direction from the ridge line direction of the prisms or the direction perpendicular to the ridge line direction comparing to when observed from the ridge line direction (arrow A1) of the prisms of the optical sheet 43 or the direction (arrow A2) perpendicular to the ridge line direction (see arrows A3 in the drawing). That is, the parts on the optical sheet 43 are observed to be darker when they are observed from the directions perpendicular to the sides 431a, 431b and 431d (see arrows A4 in the drawing) in the comparative example.

On the other hand, also in the light source apparatus 1 of the aforesaid embodiment, as shown in FIG. 2, parts on the optical sheet 43 which is arranged at the position most distant from the light guide plate 4 are especially observed to be darker when the projecting pieces 432 are observed from the directions perpendicular to the sides 431a, 431b, 431c and 431d (see arrows A4 in the drawing) comparing to when observed from the direction of ridge lines (arrow A1) of the prisms of the optical sheet 43 or the direction (arrow A2) perpendicular to the ridge line direction (see arrows A3 in the drawing). However, because each of the angles formed by the pairs of sides adjoining the projecting pieces 432 is equal to or smaller than the dark part suppressing angle, especially in the embodiment, each of the angles is set to 90 degrees coinciding with the dark part constituting angle, the directions (arrows A4) from which the parts on the optical sheet 43 are observed to be darker are to be along the respective sides 431a, 431b, 431c and 431d as shown in the drawing, and consequently occurrence of the parts to be observed darker on an optical sheet according to the angle of observing the light source apparatus can be inhibited comparing to the case of the light source apparatus 200. Furthermore, because the projecting pieces 432 are arranged at the positions where the projecting pieces 432 do not enter the display region G of the liquid crystal display panel 2 when suppose that they are moved in parallel to the pairs of sides formed by the sides 431a, 431b, 431c and 431d respectively adjoining the projecting pieces, the occurrence of the parts to be observed darker in the display region G is also prevented.

As described above, each of the angles formed by each pair of sides made of two of the sides 431a, 431b, 431c and 431d adjoining the respective projecting pieces 432 is set to 90 degrees which is an angle that is equal to or smaller than the dark part suppressing angle in the optical sheet 43 arranged at the position most distant from the light guide plate 4. Further, each of the two angles formed by any one of the straight lines L1, L2, L3 and L4 and each of the pairs of sides made of two of the sides 431a, 431b, 431c and 431d is set to 45 degrees with respect to all of the plurality of projecting pieces 432, wherein the straight lines L1, L2, L3 and L4 respectively passing through the intersection points E1, E2, E3 and E4 which are formed by extending the pairs of sides made of two of the sides 431a, 431b, 431c and 431d, and the straight lines L1, L2, L3 and L4 being the lines passing through the respective regions formed between each pair of sides among the straight lines parallel or perpendicular to ridge lines of the prisms. Consequently, the straight lines passing through the projecting pieces 432 and being parallel to the directions from which the parts on the optical sheet are observed to be darker comparing to other directions due to the projecting pieces 432, extend along each of the adjoining pairs of sides made of two of the sides 431a, 431b, 431c and 431d, or the straight lines pass through outside of the optical sheet 43, that is, outside of the regions in between each of the adjoining pairs of sides made of two of the sides 431a, 431b, 431c and 431d. Furthermore, the parts observed to be dark in the display region G can be made so as to be difficult to be observe by making at least the straight lines parallel to the directions from which the parts are easily observed to be dark not pass through the display region G. Consequently, occurrence of the parts observed to be dark on the optical sheet according to the angle from which the light source apparatus is observed can be inhibited.

Furthermore, in the aforesaid embodiment, the prisms are arranged on the optical sheet 43 so that each of the two angles be half of each of the angle formed by the pair of sides 431a and 431c, the angle formed by the pair of sides 431a and 431d, the angle formed by the pair of sides 431b and 431d and the angle formed by the pair of sides 431b and 431c. Therefore, the directions from which the parts on the optical sheet 43 are easily observed to be darker comparing to other directions can be made to follow along the pairs of sides made of two of the sides 431a, 431b, 431c and 431d as much as possible.

Furthermore, because the optical sheet 43 has an approximately rectangular shape and because the prisms are arranged so that the two angles be 45 degrees, the directions from which the parts on the optical sheet 43 are easily observed to be darker comparing to other directions can be made to follow along each of the pairs of sides made of two of the sides 431a, 431b, 431c and 431d in the approximately rectangular optical sheet 43.

Furthermore, because the projecting pieces 432 are the corner portion projecting pieces which are formed at the sheet corner parts of the optical sheet 43, the number of the projecting pieces 432 to be provided can be suppressed. When the number of the projecting pieces 432 to be provided is small, even if the optical sheet 43 warps due to temperature changes, the warp becomes difficult to be controlled by the projecting pieces 432 and the warp can be loosened.

Further, the pixels in the liquid crystal display panel 2 are arranged in a matrix, and the optical sheet 43 is arranged in such a way that the ridge line direction of the prisms be 45 degrees with respect to the row direction or the column direction, which is the direction in which the pixels arranged in the matrix are arranged. Consequently, the occurrence of moiré can be prevented.

Here, the present invention is not limited to the aforesaid embodiment and can be changed arbitrarily.

For example, in the embodiment, a case where the projecting pieces 432 are provided to all of the sheet corner parts of the optical sheet 43 has been exemplified to be described. However, the projecting pieces 432 may be respectively formed only at the corner parts of a pair of sheet corner parts arranged on one diagonal line of the optical sheet 43 (diagonal projecting piece). That is, in case of the optical sheet 43 of FIG. 5, the projecting pieces to be formed may be only one of the combinations of the projecting pieces 432a and 432c and the projecting pieces 432b and 432d. When the projecting pieces 432 are respectively formed at the corner parts of a pair of sheet corner parts on a diagonal line of the optical sheet 43, the positioning of the optical sheet 43 can be performed surely.

Furthermore, in the above case, the number of the projecting pieces 432 to be provided can be made to be smaller. Therefore, even if the optical sheet 43 warps due to temperature changes, the warp becomes difficult to be controlled by the projecting pieces 432 and the warp can be loosened.

Figure 9:
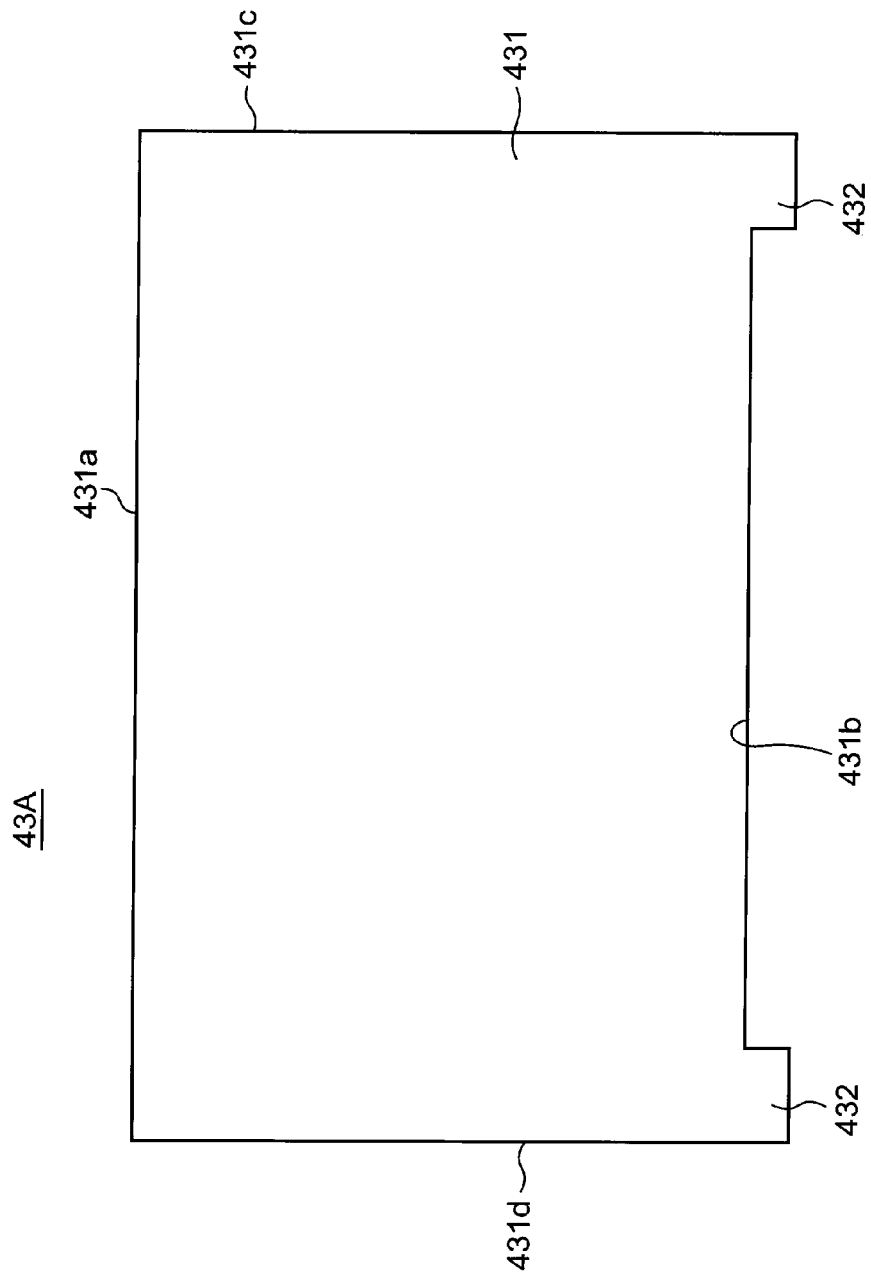
FIG. 9 is a top view showing a modification 1 of the first prism sheet of FIG. 5.

Furthermore, an optical sheet 43A shown in FIG. 9 is a prism sheet, which is a modification 1 of the optical sheet 43. As shown in FIG. 9, the projecting pieces 432 may be formed on only one side (for example, on long side 431b) of the optical sheet 43A. In such case, because the number of the projecting pieces 432 to be provided can also be made to be small, even if the optical sheet 43 warps due to temperature changes, the warp becomes difficult to be controlled by the projecting pieces 432 and the warp can be loosened.

Figure 10:
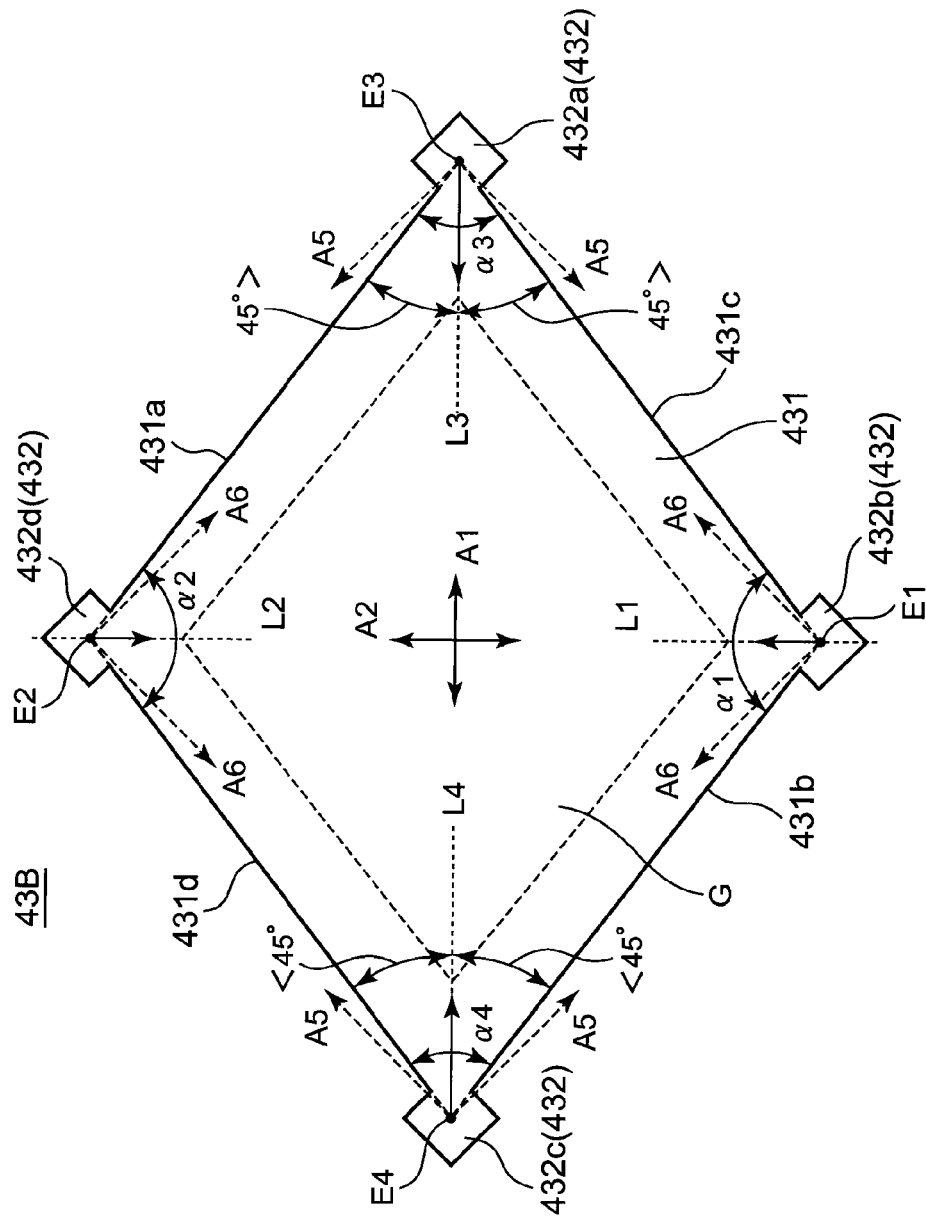
FIG. 10 is a top view showing a modification 2 of the first prism sheet of FIG. 5.

Furthermore, an optical sheet 43B shown in FIG. 10 is a prism sheet, which is a modification 2 of the optical sheet 43. In the optical sheet 43B, each of the angles formed by pairs of sides adjoining the projecting piece 432a and 432c, that is, the angle α3 formed by the sides 431a and 431c and the angle α4 formed by the sides 431b and 431d, is set to be smaller than 90 degrees, which is an angle that is equal to or smaller than the dark part suppressing angle.

Further, each of the two angles formed by the straight line L3 and a pair of sides 431a and 431c is set to be smaller than 45 degrees, wherein the straight line L3 passing through the intersection point E3 formed by extending the pair of sides 431a and 431c adjoining the projecting piece 432a and the region formed between the pair of sides 431a and 431c and the straight line L3 being parallel to ridge lines of the prisms.

Furthermore, each of the two angles formed by the straight line L4 and a pair of sides 431b and 431d is set to be smaller than 45 degrees, wherein the straight line L4 passing through the intersecting point E4 formed by extending the pair of sides 431b and 431d adjoining the projecting piece 432c and the region formed between the pair of sides 431b and 431d, and the straight line L4 being parallel to ridge lines of the prisms.

Further, the projecting piece 432a is arranged at a position where the projecting piece 432a does not enter the display region G when suppose that the projecting piece 432a is moved in parallel with respect to each of the sides 431a and 431c making the adjoining pair of sides. Furthermore, the projecting piece 432c is arranged at a position where the projecting piece 432c does not enter the display region G when suppose that the projecting piece 432c is also moved in parallel with respect to each of the sides 431b and 431d making the adjoining pair of sides.

Moreover, each of the angles formed by pairs of sides of the optical sheet 43B adjoining the projecting piece 432b and 432d, that is, the angle α2 formed by the sides 431a and 431d and the angle α1 formed by the sides 431b and 431c, is set to be greater than 90 degrees and to be equal to or smaller than 100 degrees, which is an angle that is equal to or smaller than the dark part suppressing angle.

Further, each of the two angles formed by the straight line L1 and the sides making the pair of sides 431b and 431c is set to be greater than 45 degrees and to be equal to or smaller than 50 degrees, wherein the straight line L1 passing through the intersection point E1 formed by extending the pair of sides 431b and 431c adjoining the projecting piece 432b and the region formed between the pair of sides 431b and 431c and the straight line L1 being perpendicular to ridge lines of the prisms.

Furthermore, each of the two angles formed by the straight line L2 and the pair of sides 431a and 431d is set to be greater than 45 degrees and to be equal to or smaller than 50 degrees, wherein the straight line L2 passing through the intersection point E2 formed by extending the pair of sides 431a and 431d adjoining the projecting piece 432d and the region formed between the pair of sides 431a and 431d and the straight line L2 being perpendicular to ridge lines of the prisms.

Further, the projecting piece 432b is arranged at a position where the projecting piece 432b does not enter the display region G when suppose that the projecting piece 432b is moved in parallel to each of the sides 431b and 431c making the adjoining pair of sides. Furthermore, the projecting piece 432d is arranged at a position where the projecting piece 432d does not enter the display region G when suppose that the projecting piece 432d is also moved in parallel to each of the sides 431a and 431d making the adjoining pair of sides.

By using the above optical sheet 43B, because each of the angles formed by the pairs of sides adjoining the projecting pieces 432a and 432c is equal to or smaller than the dark part suppressing angle and especially in the modification 2, each of the angles is smaller than 90 degrees which is smaller than the dark part constituting angle, a straight lines A5, which are parallel to the direction from which the parts on the optical sheet 43B are easily observed to be dark due to the projecting pieces 432a and 432c, pass through outside of the optical sheet 43B, that is, outside of the region in between the adjoining pairs of the sides made of two of the sides 431a, 431b, 431c and 431d.

Further, because each of the angles formed by the pairs of sides adjoining the projecting pieces 432b and 432d is set so as to be equal to or smaller than the dark part suppressing angle, the straight lines A6, which are parallel to the direction from which the parts on the optical sheet 43B are easily observed to be dark due to the projecting pieces 432b and 432d, pass through inside of the optical sheet 43B, that is, inside of the region in between the adjoining pairs of the sides made of two of the sides 431a, 431b, 431c and 431d. However, the straight lines A6 pass through a region excluding the display region G of the optical sheet 43B.

As described above, each of the angles formed by the pairs of sides made of two of the sides 431a, 431b, 431c and 431d adjoining to each of the projecting pieces 432a and 432c of the optical sheet 43B arranged at the position most distant from the light guide plate 4 is set to be smaller than 90 degrees which is an angle that is equal to or smaller than the dark part suppressing angle, and each of the angles making the pair of angles formed by one of the straight lines L3 or L4 and each of the sides making the pairs of sides made of two of the sides 431a, 431b, 431c and 431d is set to be smaller than 45 degrees with respect to all of the projecting pieces 432a and 432c, wherein the straight line L3 or L4 is a straight line that passes through the intersection point E3 or E4 and passes through the region formed between pairs of sides among the straight lines parallel to ridge lines of the prisms. Consequently, the straight lines A5, passing through the projecting pieces 432a and 432c and being parallel to the direction from which the parts on the optical sheet 43B are easily observed to be darker due to the projecting pieces 432a and 432c, pass through outside of the optical sheet 43B, that is, outside of the region in between the pairs of sides made of two of the sides 431a, 431b, 431c and 431d.

Further, each of the angles formed by the pairs of sides made of two of the sides 431a, 431b, 431c and 431d adjoining the projecting pieces 432b and 432d of the optical sheet 43B is set to be greater than 90 degrees and to be smaller than 100 degrees, which is an angle that is equal to or smaller than the dark part suppressing angle, and each of the angles making the pairs of angles formed by one of the straight lines L2 or L1 and each of the sides making the pairs of sides made of two of the sides 431a, 431b, 431c and 431d is set to be greater than 45 degrees and to be smaller than 50 degrees with respect to all of the projecting pieces 432b and 432d, wherein the straight lines L2 or L1 is a straight line passing through the region in between a pair of sides among the straight lines passing through the intersection points E2 and E1 and being perpendicular to ridge lines of the prisms. Consequently, the straight lines A6, passing through the projecting pieces 432b and 432d and being parallel to the direction from which the parts on the optical sheet 43B are easily observed to be darker comparing to other directions due to the projecting piece 432b and 432d, pass through the region excluding the display region G of the optical sheet 43B.

Accordingly, by setting at least the above mentioned straight lines A5 and A6, which are parallel to the direction from which the parts on the optical sheet 43B are easily observed to be dark comparing to other directions, so as not to pass through inside of the display region G, the parts which are observed to be dark can be made so as to be difficult to be seen in the display region G and occurrence of the parts which are observed to be dark on the optical sheet according to the angle in which the light source apparatus is seen can be inhibited.

Figure 11:
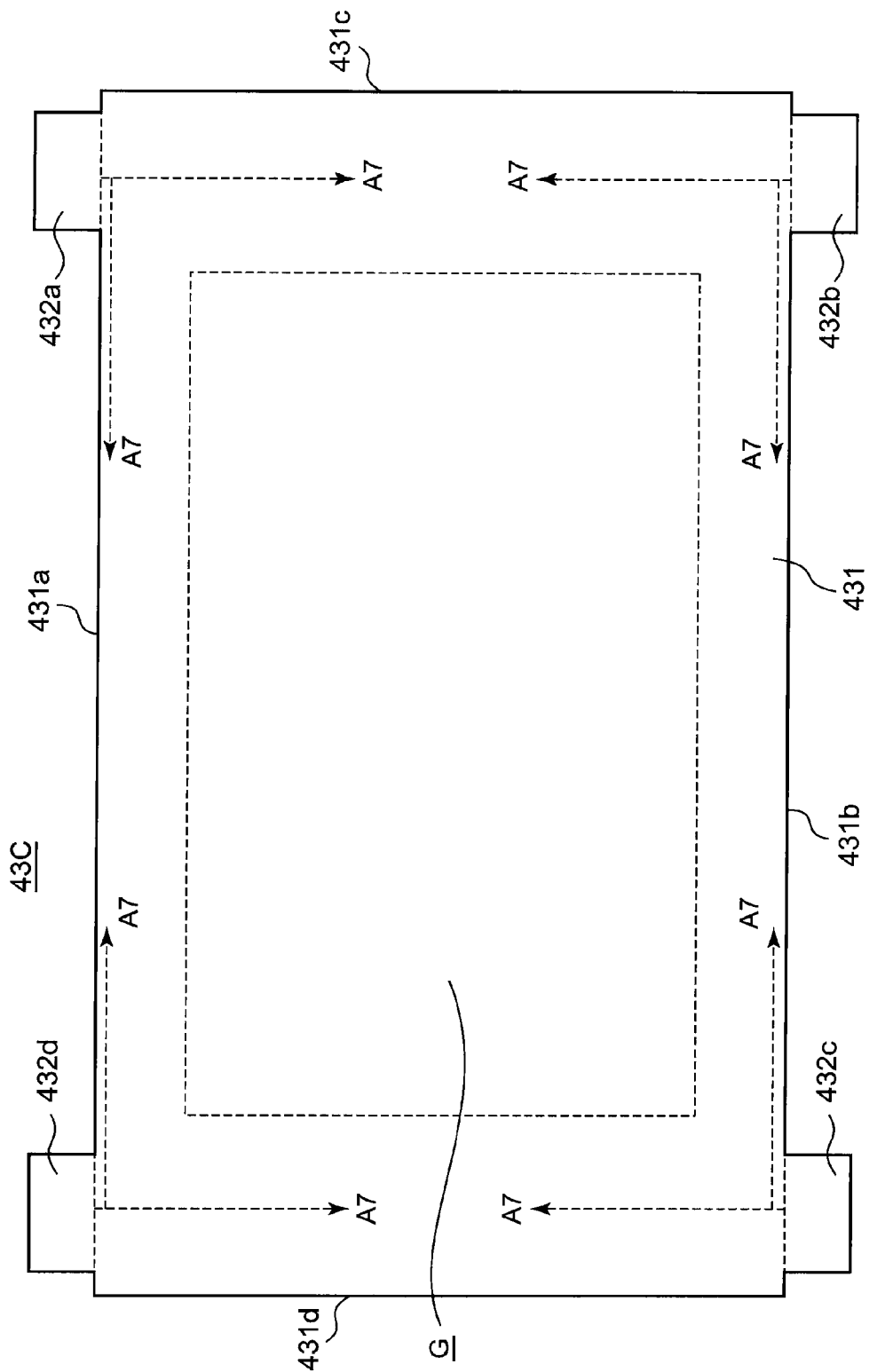
FIG. 11 is a top view showing a modification 3 of the first prism sheet of FIG. 5.

Furthermore, the optical sheet 43C shown in FIG. 11 is a prism sheet, which is a modification 3 of the optical sheet 43. The optical sheet 43C includes a sheet main body 431 in an approximately rectangular shape and four projecting pieces 432 integrally formed in a shape projecting outward from fringes of the four sheet corner parts of the sheet main body 431, respectively.

Moreover, the plurality of projecting pieces 432 are arranged at the positions where the projecting pieces 432 do not enter the display region G of the liquid crystal display panel 2 when suppose that the projecting pieces 432 are moved in parallel along the respectively adjoining pairs of sides made of two of the sides 431a, 431b, 431c and 431d. When the above optical sheet 43C is used, straight lines A7, which are parallel to the direction from which the parts on the optical sheet 43C are easily observed to be dark, pass through inside of the optical sheet 43C, that is, through the region in between the adjoining pairs of sides made of two of the sides 431a, 431b, 431c and 431d. However, the straight lines A7 pass through a region excluding the display region G of the optical sheet 43C. Consequently, occurrence of the parts which are observed to be dark on the optical sheet according to the angle in which the light source apparatus is seen can be inhibited.

Furthermore, an optical sheet 43D shown in FIG. 12 is a prism sheet, which is a modification 4 of the optical sheet 43. When it is desired to simply inhibit the occurrence of the parts which are observed to be dark according to the angle in which the light source apparatus is seen, merely forming only one projecting piece 432 (corner portion projecting piece) at a sheet corner part as in the optical sheet 43D is sufficient.

Further, it is needless to say that the light source apparatus of the embodiment can be applied to other display apparatuses which include a backlight type display panels other than the display apparatus which includes the liquid crystal display panel.

Moreover, in the embodiment, the dark part suppressing angle is set to 100 degrees. However, this angle can be changed arbitrarily as long as the straight line which is parallel to the direction from which the part near by the projecting pieces are observed to be dark does not overlap the display region of the display apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A light source apparatus, comprising:
  a light guide plate;
  a plurality of optical sheets provided so as to be layered on a light emitting surface of the light guide plate; and
  a frame housing the light guide plate and the plurality of optical sheets therein, wherein:
  one of the plurality of optical sheets which is arranged at a position most distant from the light guide plate is a prism sheet, the prism sheet having:
    (i) a plurality of prisms formed on one surface thereof which are extended in parallel with each other, and
    (ii) one or more projecting pieces which are integrally formed with the prism sheet in a shape projecting from a fringe of the prism sheet,
  the one or more projecting pieces engage to the frame,
  at least one of the one or more projecting pieces is a dark part suppressing projecting piece,
  sides making a pair of sides adjoining the dark part suppressing projecting piece are dark part suppressing sides,
  a first angle formed by a pair of dark part suppressing sides is equal to or smaller than a dark part suppressing angle, and
  second angles, making a pair of angles formed with a straight line and each of sides making the pair of dark part suppressing sides, are equal to or smaller than half of the dark part suppressing angle, the straight line:
    (i) passing through a region formed between the pair of dark part suppressing sides,
    (ii) passing through an intersection point of the pair of dark part suppressing sides, and
    (iii) being parallel or perpendicular to ridge lines of the prisms.
2. The light source apparatus according to claim 1, wherein the prisms are arranged so that the second angles are half of the first angle formed by the pair of dark part suppressing sides.
3. The light source apparatus according to claim 2, wherein the prism sheet is formed in an approximately rectangular shape, and
  the prisms are arranged so that the second angles are 45 degrees.
4. The light source apparatus according to claim 1, wherein:
  a plurality of projecting pieces are formed on the fringe of the prism sheet and all of the projecting pieces are the dark part suppressing projecting pieces, all of first angles formed by a plurality of pairs of dark part suppressing sides respectively adjoining the dark part suppressing projecting pieces are equal to or smaller than 90 degrees, and all of second angles making a plurality of pairs of angles respectively corresponding to the dark part suppressing projecting pieces are equal to or smaller than 45 degrees, each of the pairs of angles being formed with the straight line and each of the sides making the pair of dark part suppressing sides, and the straight line:
(i) passing through the region formed between the pair of dark part suppressing sides,
(ii) passing through the intersection point of the pair of dark part suppressing sides, and
(iii) being parallel or perpendicular to the ridge lines of the prisms.

5. The light source apparatus according to claim 1, wherein a plurality of projecting pieces:
(i) are formed on the fringe of the prism sheet, and
(ii) include a pair of diagonal projecting pieces, the diagonal projecting pieces formed at a pair of sheet corner parts and arranged on a diagonal line of the prism sheet.

6. The light source apparatus according to claim 1, wherein all of the one or more projecting pieces are formed on one side of the prism sheet.

7. The light source apparatus according to claim 1, wherein the one or more projecting pieces include a corner part projecting piece formed at a sheet corner part of the prism sheet.

8. The light source apparatus according to claim 1, wherein each of the one or more projecting pieces has at least two projecting piece angle portions which do not overlap extension lines of the pair of dark part suppressing sides.

9. A display apparatus, comprising:
the light source apparatus according to claim 1; and
a back light type display panel arranged on the plurality of optical sheets of the light source apparatus;
wherein the dark part suppressing projecting piece is arranged at a position where, if the dark part suppressing projecting piece were movable in parallel along the dark part suppressing sides, the dark part suppressing projecting piece would not enter a display region of the display panel.

10. The display apparatus according to claim 9, wherein the display panel includes a plurality of pixels arranged in a matrix, and the prism sheet is arranged so that a direction of the ridge lines of the prisms is 45 degrees with respect to a row direction or a column direction of the pixels.

11. A light source apparatus, comprising:
a light guide plate;
a plurality of optical sheets provided so as to be layered on a light emitting surface of the light guide plate; and
a frame housing the light guide plate and the plurality of optical sheets therein, wherein:
a back light type display panel is arranged on the plurality of optical sheets of the light source apparatus,
one of the plurality of optical sheets which is arranged at a position most distant from the light guide plate is a prism sheet, the prism sheet having:
(i) a plurality of prisms formed on one surface thereof which are extended in parallel with each other, and
(ii) one or more projecting pieces which are integrally formed with the prism sheet in a shape projecting from a fringe of the prism sheet,
the one or more projecting pieces engage to the frame,
at least one of the one or more projection pieces is a dark part suppressing projecting piece, sides making a pair of sides adjoining the dark part suppressing projecting piece are dark part suppressing sides, and the dark part suppressing projecting piece is arranged at a sheet corner part where, if the dark part suppressing projecting piece were movable in parallel along the dark part suppressing sides, the dark part suppressing projecting piece would not enter a display region of the display panel.

12. The light source apparatus according to claim 11, wherein:
a first angle formed by the pair of dark part suppressing sides is equal to or smaller than a dark part suppressing angle, and
second angles making a pair of angles formed with a straight line and each of the sides making the pair of dark part suppressing sides are equal to or smaller than half of the dark part suppressing angle, the straight line:
(i) passing through a region formed between the pair of dark part suppressing sides,
(ii) passing through an intersection point of the pair of dark part suppressing sides, and
(iii) being parallel or perpendicular to ridge lines of the prisms.

13. A display apparatus, comprising:
the light source apparatus according to claim 11; and
a back light type display panel arranged on the plurality of optical sheets of the light source apparatus,
wherein the dark part suppressing projecting piece is arranged at a position where, if the dark part suppressing projecting piece were movable in parallel along the dark part suppressing sides, the dark part suppressing projecting piece would not enter a display region of the display panel.

14. A light source apparatus, comprising:
a light guide plate;
a plurality of optical sheets provided so as to be layered on a light emitting surface of the light guide plate; and
a frame housing the light guide plate and the plurality of optical sheets therein, wherein
one of the plurality of optical sheets which is arranged at a position most distant from the light guide plate is a prism sheet, the prism sheet having:
(i) a plurality of prisms formed on one surface thereof which are extended in parallel with each other,
(ii) an approximately rectangular shape, and
(iii) dark part suppressing pieces each of which is integrally formed at each of sheet corner parts of the prism sheet in a shape projecting from a fringe of the prism sheet,
the dark part suppressing pieces engage to the frame,
sides making a pair of sides adjoining each of the dark part suppressing projecting pieces are dark part suppressing sides,
all of first angles formed by a plurality of pairs of dark part suppressing sides respectively adjoining the dark part suppressing projecting pieces are 90 degrees, and
all of second angles making a plurality of pairs of angles respectively corresponding to the dark part suppressing projecting pieces are 45 degrees, each of the pairs of angles being formed with a straight line and each of sides making a pair of dark part suppressing sides wherein the straight line:
(i) passes through a region formed between the pair of dark part suppressing sides,
(ii) passes through an intersection point of the pair of dark part suppressing sides, and (iii) is parallel or perpendicular to ridge lines of the prisms.

15. A display apparatus, comprising;

the light source apparatus according to claim 14; and a liquid crystal display panel arranged on the plurality of optical sheets of the light source apparatus, which has a display region in an approximately rectangular shape, wherein the dark part suppressing projecting pieces are arranged at positions where, if the dark part suppressing projecting piece were movable in parallel along the dark part suppressing sides, the dark part suppressing projecting piece would not enter a display region of the display panel.

* * * * *